No. 680,861. Patented Aug. 20, 1901.
J. J. HEATON.
NUT LOCK.
(Application filed Apr. 18, 1901.)
(No Model.)

Inventor
John J. Heaton

Witnesses

By Attorneys

UNITED STATES PATENT OFFICE.

JOHN JAMES HEATON, OF WEST BURLINGTON, IOWA.

NUT-LOCK.

SPECIFICATION forming part of Letters Patent No. 680,861, dated August 20, 1901.

Application filed April 18, 1901. Serial No. 56,399. (No model.)

*To all whom it may concern:*

Be it known that I, JOHN JAMES HEATON, a citizen of the United States, residing at West Burlington, in the county of Des Moines and State of Iowa, have invented certain new and useful Improvements in Nut-Locks; and I do declare the following to be a full, clear, and exact description of the invention, such as will enable others skilled in the art to which it appertains to make and use the same.

This invention relates to improvements in nut-locks.

The object of the invention is to provide simple and effective means for locking the packing-nuts of the glands or stuffing-boxes of an air-brake pump against retrograde rotation and preventing them from becoming loose and causing leakage.

Figure 1:
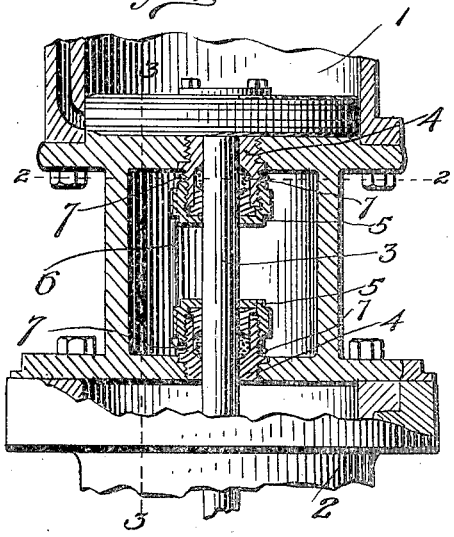
Figure 2:
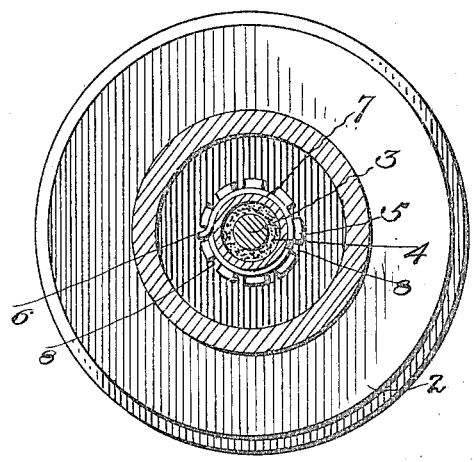
Figure 3:
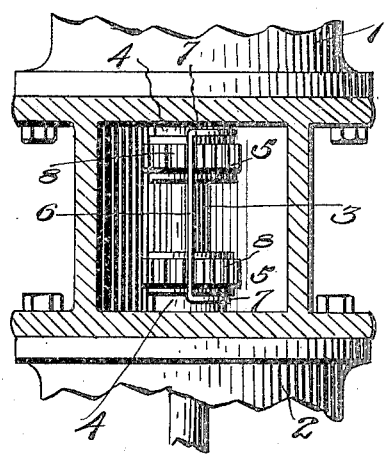
Figure 4:
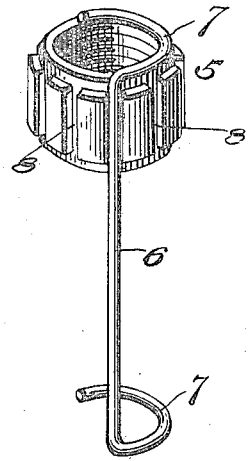

In the accompanying drawings, Figure 1 is a vertical central section through the meeting ends of the cylinders of an air-brake pump of ordinary construction, showing the application of the invention thereto. Fig. 2 is a sectional plan view on line 2 2 of Fig. 1. Fig. 3 is a vertical section on line 3 3 of Fig. 1 looking toward the packing-nuts and locking device and showing the same in elevation, and Fig. 4 is a perspective view of the nut-lock device and one of the packing-nuts.

Referring now more particularly to the drawings, the numerals 1 and 2 represent the cylinders of an air-brake pump of known construction, and 3 the piston-rod of the pump, which works through the stuffing-boxes 4 in the adjoining heads of the said cylinders. Each stuffing-box is provided with an adjusting cap or nut 5 for tightening the packing about the piston-rod. These nuts screw on their respective packing-boxes in reverse directions, and it is the purpose of this invention to provide means for connecting the nuts together, so that the tendency of one to unscrew and become loose will be counteracted or resisted by the other.

The nut-lock device comprises a single piece of material, preferably a rod or stout piece of wire having a straight main stem 6 and approximately semicircular end clasps or hooks 7, formed by bending the rod or wire at right angles to the stem and in the same direction and then curving the ends thereof outwardly and inwardly to form the said clasps or hooks.

In applying the nut-lock device for use the main stem 6 is fitted within the slots or notches 8, which are formed upon the outer surface of each nut for the reception of a spanner-wrench to tighten and loosen the nut, and the clasps or hooks 7 forced about the stuffing-boxes 4 to partially encompass the same and support the nut-lock device in position against casual displacement. As the main stem 6 fits within two coincident slots or notches 8 in the two nuts 5, it will be readily seen that said nuts are positively connected and that as the nuts are screwed on their respective stuffing-boxes in reverse directions the tendency of one nut to turn backward and become loosened will be effectually counteracted and overcome by the resistance of the other nut. The semicircular end hooks or clasps 7 by engaging the body portions of the stuffing-boxes prevent lateral and outward movement of the main stem 6, so that the latter will be held securely in the slots or notches 8 against casual displacement. The said semicircular clasps or hooks 7 are preferably made slightly yielding or resilient, so as to exert a more or less spring-clamping action on the stuffing-boxes 4 to afford a firm and secure grip upon the same.

The advantage of my improved construction of nut-lock is that it provides a simple and effective form of device, which may be cheaply manufactured, readily applied and removed, and is adapted to hold the nuts 5 positively in adjusted position and obviate any tendency of the same to turning backwardly and becoming loosened, and thereby causing leakage of the air and steam through the stuffing-boxes.

Variations in the form, proportions, and details of construction of the device may be made within the scope of the invention without departing from the spirit or sacrificing any of the advantages thereof.

Having thus fully described my invention, what I claim as new, and desire to secure by Letters Patent, is—

1. A nut-lock device consisting of a rod or stout piece of wire, comprising a straight main stem bent at its ends to form approximately semicircular right-angularly-projecting hooks or clasps, substantially as described.

2. A nut-lock device for connecting and holding against retrograde rotation two nuts, one having a right and the other a left hand thread, the same consisting of a rod or wire having a main stem adapted to interlock with the nuts, said stem being provided at each end with a semicircular hook or clasp to partially encompass the part or parts to which the said nuts are applied, substantially as described.

3. In a nut-lock, the combination with right and left threaded members, of right and left threaded nuts thereon provided with slots, and a nut-locking device consisting of a rod or wire formed with a main stem to engage the slots in the nuts, and end clasps to embrace the said right and left threaded members to which the nuts are applied, substantially as described.

In testimony whereof I have hereunto set my hand in presence of two subscribing witnesses.

JOHN JAMES HEATON.

Witnesses:
　GEORGE W. SCHOLES,
　THOMAS F. DORAN.